United States Patent [19]

Miyamoto

[11] Patent Number: 5,687,409
[45] Date of Patent: Nov. 11, 1997

[54] CAMERA DISPLAY DEVICE FOR DISPLAYING INFORMATION BASED ON PHOTOGRAPHIC OPTICAL SYSTEM FOCUSING CONTROL

[75] Inventor: Hidenori Miyamoto, Urayasu, Japan

[73] Assignee: Nikon Corporation, Tokyo, Japan

[21] Appl. No.: 622,621

[22] Filed: Mar. 27, 1996

[30] Foreign Application Priority Data

Mar. 28, 1995 [JP] Japan .................................... 7-069131

[51] Int. Cl.$^6$ .............................. G03B 17/00; G03B 3/00; G03B 13/18
[52] U.S. Cl. ........................... 396/290; 396/121; 396/80; 396/287
[58] Field of Search ................... 354/400, 402, 354/403, 408, 409, 289.1, 289.11; 396/281, 287, 290, 292, 104, 121, 80, 70, 234

[56] References Cited

U.S. PATENT DOCUMENTS

| | | | |
|---|---|---|---|
| 4,341,451 | 7/1982 | Krueger et al. | 354/289 |
| 5,041,859 | 8/1991 | Ishiguro et al. | 354/400 |
| 5,146,261 | 9/1992 | Soshi | 354/402 |
| 5,151,583 | 9/1992 | Tokunaga et al. | 354/406 |
| 5,264,889 | 11/1993 | Ishida et al. | 354/402 |
| 5,296,888 | 3/1994 | Yamada | 354/402 |
| 5,315,341 | 5/1994 | Hibbard | 354/402 |
| 5,369,461 | 11/1994 | Hirasawa et al. | 354/402 |
| 5,473,403 | 12/1995 | Suda et al. | 354/409 |
| 5,510,875 | 4/1996 | Yamamoto et al. | 354/409 |

*Primary Examiner*—Safet Metjahic
*Assistant Examiner*—Michael Dalakis

[57] ABSTRACT

A display device for a camera to accurately display distance information and depth of field information. The camera includes a focusing control device to drive a photographic optical system to an in-focus position in relation to a photographic subject. A distance region identification device identifies a distance region to which the photographic subject belongs from among a plurality of predetermined distance regions into which the photographic distance range which can be achieved by photographic optical systems has been divided, according to information derived by a focus control operation by the focusing control device. A distance information display modifies the display conditions of one part of a display having multiple display segments to indicate one part of the photographic distance range which can be achieved by the photographic optical systems. The distance region identification device can set the number of divisions of the distance region to an integer multiple of the number of display segments of the distance information display device. A depth of field for the photographic subject is computed based on the photographic distance and the computed depth of field is displayed on a group of display segments corresponding to the depth of field.

20 Claims, 13 Drawing Sheets

DISTANCE STEP TABLE
| FOCUS STEP | PHOTOGRAPHIC DISTANCE | SWITCH DISTANCE | PULSE NUMBER |
|---|---|---|---|
| 1 | $L_1$ |  | 1 |
| 2 | $L_2$ | $C_3$ | 2 |
| 3 | $L_3$ |  | 3 |
| 4 | $L_4$ | $C_4$ | 4 |
|  |  | $C_5$ |  |
| n−2 | $L_{n-2}$ | $C_{n-2}$ | n−2 |
| n−1 | $L_{n-1}$ | $C_{n-1}$ | n−1 |
| n | $L_n$ | $C_n$ | n |
FIG. 3A
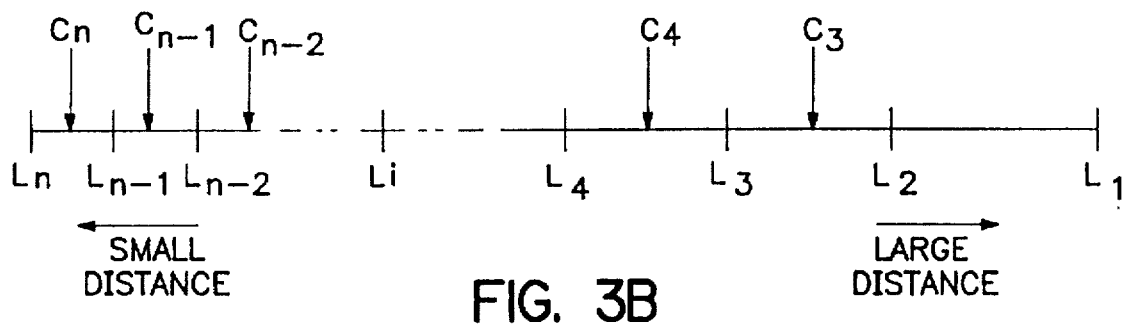
FIG. 3B
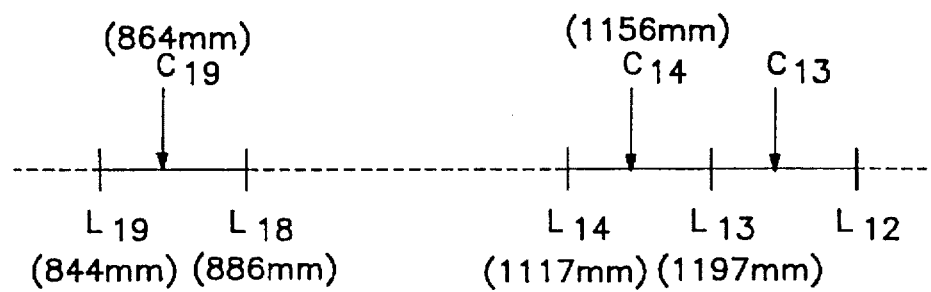
FIG. 3C

CAMERA DISPLAY DEVICE FOR DISPLAYING INFORMATION BASED ON PHOTOGRAPHIC OPTICAL SYSTEM FOCUSING CONTROL

BACKGROUND OF THE INVENTION

1. Field of the Invention

The present invention relates to a camera display device to display distance information and subject depth of field information, and, more particularly, the present invention relates to a camera for accurately displaying distance information and subject depth of field information based on information obtained during a focusing control process to bring a photographic optical system to an in-focus state.

2. Description of the Related Art

A conventional camera which displays distance information with a liquid crystal display device is disclosed in Japanese Laid-Open Patent Publication No. 56-128931. In operation of the conventional camera, a photographer measures the subject distance and a photographic optical system is driven to an in-focus position by the photographer rotating a distance ring. The stop position of the photographic optical system and the subject brightness are then detected, the subject depth of field is computed, and the computational result is displayed. However, when the focus of the photographer is not correct, display errors are produced with the conventional camera because the subject distance and the subject depth of field are computed and displayed based on the incorrect focus of the photographer.

SUMMARY OF THE INVENTION

It is an object of the present invention to provide a camera which can display distance information and subject depth of field information in a simple manner.

It is another object of the present invention to provide a camera having a display device to display photographic distance information and subject depth of field information based on information obtained during a focusing control process for a photographic optical system.

Additional objects and advantages of the invention will be set forth in part in the description which follows, and, in part, will be obvious from the description, or may be learned by practice of the invention.

Objects and advantages of the present invention are attained in accordance with an embodiment of the present invention with a camera including a photographic optical system; a focus control device to drive the photographic optical system to an in-focus position with respect to a targeted photographic subject; a distance range identification device to identify a distance range to which the photographic distance to the targeted photographic subject belongs from among a plurality of predetermined distance ranges into which a photographic distance range which can be achieved by the photographic optical system is divided; and a distance information display device to display a photographic distance of the targeted subject. The distance range identification device identifies the predetermined distance range to which the photographic distance to the targeted photographic subject belongs based on the focus control performed by the focus control device. The distance information display device includes multiple display segments and the number of predetermined distance ranges is set to an integer multiple of the number of display segments of the distance information display device by the distance range identification device.

In accordance with embodiments of the present invention, the camera includes an aperture value identification device to identify an aperture value for the photographic optical system, and a focal point distance detection device to identify a focal point distance of the photographic optical system. A computation device calculates the subject depth of field based on the aperture value information from the aperture value identification device, the focal point distance information from the focal point distance device, and the photographic distance information obtained during the focus control operation performed by the focus control device to bring the photographic optical system to an in-focus state. A subject depth of field display device identifies a group of display segments from the plurality of display segments corresponding to the photographic distance range based on the subject depth of field calculated by the computation device. The group of display segments identify the subject depth of field corresponding to the photographic distance of the targeted subject.

In accordance with embodiments of the present invention, the subject depth of field display device eliminates the display segments which represent both a photographic distance within the computed subject depth of field and a photographic distance outside the subject depth of field from the group of display segments identifying the subject depth of field for a targeted subject.

Objects and advantages of the present invention are also achieved in accordance with embodiments of the invention with a camera including a photographic optical system; a distance measurement device to measure a distance to a photographic subject; a distance range identification device to identify a distance range to which the distance measured by the distance measurement device belongs from among a plurality of predetermined distance ranges into which the photographic distance range which can be achieved by the photographic optical system is divided, wherein the photographic distance range which can be achieved by the photographic optical system is (0.6 m—∞); a focusing drive device to drive the photographic optical system to an in-focus position based on the identification results of the distance range identification device; an aperture value identification device to identify an aperture value of the photographic optical system; a focal point distance identification device to identify the focal point distance of the photographic optical system; a distance information display device having multiple display segments, to display the photographic distance; a computation device to compute the subject depth of field based on the aperture value information from the aperture value identification device, the focal point distance information from the focal point distance identification device, and the photographic distance information obtained from at least one of the distance measurement device and distance range identification device; and, a subject depth of field display device to display the subject depth of field computed by the computation device. The distance range identification device sets the number of predetermined distance ranges into which the distance range which can be achieved by the photographic optical system is divided into an integer multiple of the number of display segments of the distance information display device. When a correspondence has been made between multiple display segments of the distance information display device and the photographic distance range which can be achieved by the photographic optical system, the subject depth of field display device identifies, from the multiple display segments, a display segment group corresponding to the subject depth of field for the photographic distance of the targeted subject based on the computational results of the computation device.

Objects and advantages of the present invention are achieved in accordance with embodiments of the present invention with a camera having a focal point detection device to detect an amount of shift of the position of a photographic optical system required to focus a photographic subject (i.e., a defocus amount); a drive device to drive the photographic optical system to an in-focus position based on the information detected by the focal point detection device; a distance range identification device to identify a predetermined distance range from the photographic distance range which can be achieved by the photographic optical system, wherein the photographic distance range which can be achieved by the photographic optical system is divided into a plurality of distance ranges, and the distance range identification device identifies the distance range to which the in-focus position of photographic optical system belongs; an aperture value identification device to identify an aperture value of the photographic optical system; a focal point distance identification device to identify the focal point distance of the photographic optical system; a distance information display device having multiple display segments to modify the display conditions of one segment of the multiple display segments to indicate a photographic distance from the photographic distance range which can be achieved by photographic optical system; and a computation device to compute the subject depth of field based on the aperture value information from the aperture value identification device, the focal point distance information from the focal point distance identification device, and the photographic distance information identified by the distance range identification device. The photographic distance range which can be achieved by the photographic optical system is divided into a number of distance ranges which is an integer multiple of the number of display segments of the distance information display device by the distance range identification device. A subject depth of field display position identification device is provided which, when a correspondence has been made between the plurality of display segments of the distance information display device and the photographic distance range which can be achieved by the photographic optical system, identifies a display segment group from the plurality of display segments corresponding to the photographic distance in the subject depth of field based on the computational results of computation device.

In accordance with embodiments of the present invention, because photographic distance information is obtained by the focus control device in the process of controlling the in-focus position of a photographic optical system, correct distance information can be displayed by controlling the display of distance information based on the photographic distance information obtained by the focus control device. Further, since the number of positions at which the photographic optical system is stopped is an integer multiple of the number of display segments, the terminal position of the photographic optical system can be easily made to correspond with the display segments.

In accordance with embodiments of the present invention, the subject depth of field is computed from the aperture value information from the aperture value identification device, the focal point distance information from the focal point distance identification device, and the photographic distance information that the focus control device obtains in the process of controlling the in-focus position of the photographic optical system. Based on the results of the subject depth of field computation, the display segment group corresponding to the photographic distance within the subject depth of field is identified from the multiple display segments.

In accordance with embodiments of the present invention, display segments which identify even one part of the photographic distance outside the subject depth of field are eliminated from the display segment group corresponding to the photographic distance within the subject depth of field. As a result, the problem of displaying a subject depth of field range wider than the actual subject depth of field as being within the subject depth of field is eliminated.

In accordance with embodiments of the present invention, when the camera is an active distance measurement type camera, the distance range identification device identifies a distance range from among a plurality of photographic distance ranges to which the subject distance detected by the distance measurement device belongs, and based on those identification results, drives the photographic optical system to the in-focus position.

In accordance with embodiments of the present invention, photographic distance information can be obtained from at least one of distance measurement device or a distance range identification device, and by computing the subject depth of field from the photographic distance information, the aperture value information from the aperture value identification device and the focal point distance information from the focal point distance identification device, the subject depth of field can be displayed by the distance information display device. Because the number of divisions of the photographic distance ranges in the distance range identification device is an integer multiple in relation to the number of display segments provided in the distance information display device, the correspondence between the computed results of the subject depth of field and display segments can be easily executed.

In accordance with embodiments of the invention, when the camera is a so-called passive type camera which drives a photographic optical system based on the amount of shift in the location of photographic optical system detected by focal point detection device, the photographic distance of the photographic optical system cannot be specified from focal point detection device itself. Consequently, the photographic distance range to which the photographic optical system currently belongs is detected by the distance range identification device and the subject depth of field is computed from the photographic distance information detected, the aperture value information from aperture value identification device, and focal point distance information from focal point distance identification device; and the subject depth of field is displayed on the distance information display device. Further, since the number of photographic distance ranges identified by the distance range identification device is an integer multiple in relation to the number of display segments provided on distance information display device, the correspondence between the computed results of the subject depth of field and the display segments can be easily executed.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIG. 3A is a table showing a relationship between the photographic distance and the focus steps of a camera in accordance with the first embodiment of the present invention.

FIGS. 3B and 3C show a relationship between the photographic distance and a plurality of distance ranges within a distance range achievable by a photographic optical system of a camera in accordance with the first embodiment of the present invention.

DETAILED DESCRIPTION OF THE PREFERRED EMBODIMENTS

Figure 1:
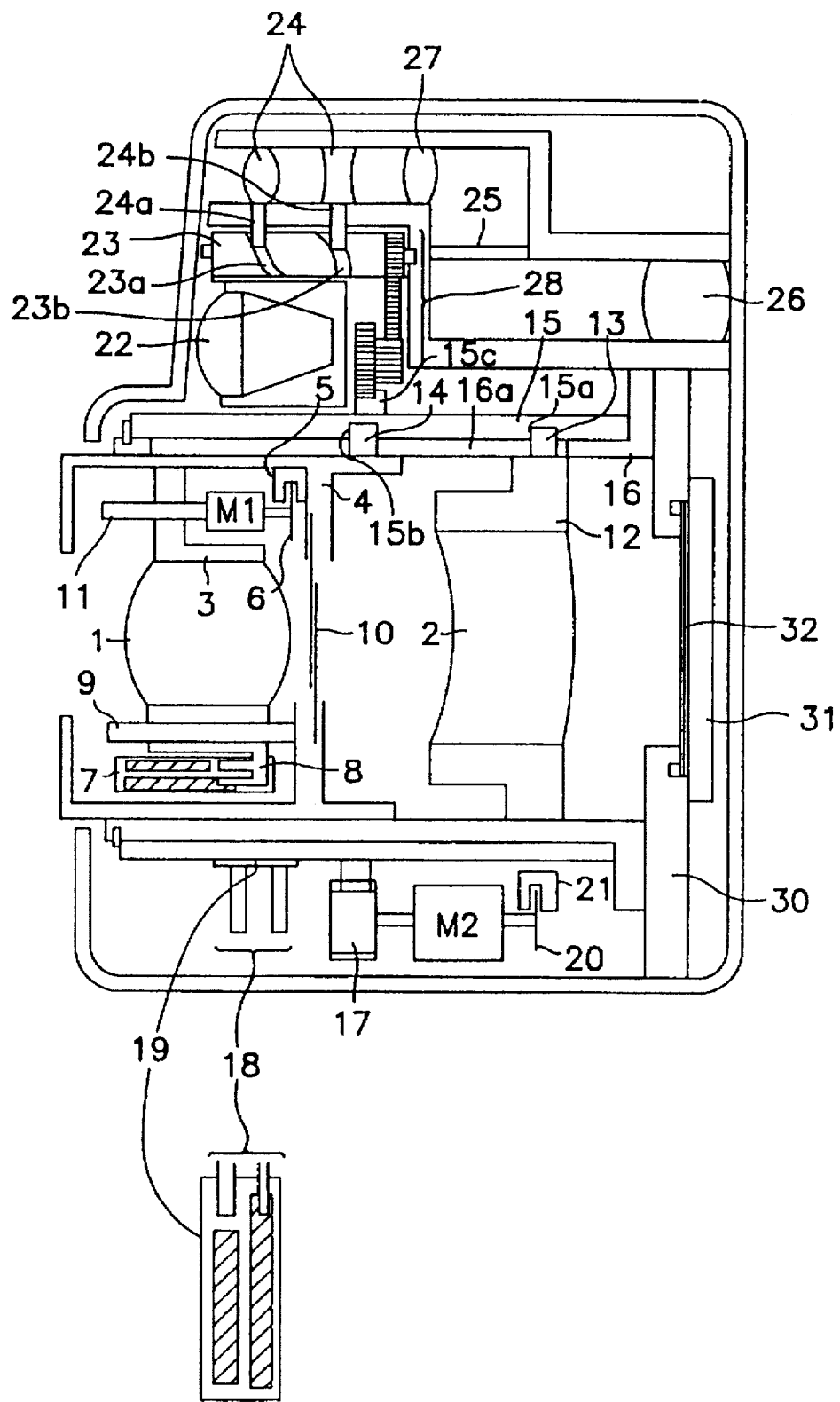
FIG. 1 is a side view of an interior configuration of a camera in accordance with a first embodiment of the present invention.

Reference will now be made in detail to the preferred embodiments of the present invention, examples of which are illustrated in the accompanying drawings, wherein like reference numerals refer to the same or similar elements throughout.

A first embodiment of the present invention will be described with reference to FIGS. 1-7. FIG. 1 is a side view of an interior configuration of a camera in accordance with the first embodiment of the present invention. As shown in FIG. 1, the camera includes a first lens group 1 and a second lens group 2. The first lens group 1 is supported by a first support frame 3 which is seated within a first moveable frame 4. The second lens group 2 is supported by a second support frame 12. A focusing motor M1 and a shutter 10 are mounted on the first moveable frame 4. The photographic optical system is brought to an in-focus position by rotation of a transfer screw 11, threaded in the first support frame 3, by the focusing motor M1. When the transfer screw 11 rotates, the first support frame 3 moves in the direction of the optical axis following a guide axis 9 secured to the first moveable frame 4 to adjust the photographic optical system to an in-focus position. As the first lens group 1 is moved toward the front of the camera (the left side in FIG. 1), a shorter photographic distance is brought into focus.

In order to detect the amount of movement of the first lens group 1, a slit disk 6 is rotationally driven by the focusing motor M1 as the focusing motor M1 drives the first lens group 1, and a photointerrupter 5 outputs pulse array signals corresponding to the amount of rotation of the slit disk 6. Moreover, when the first lens group 1 is extended toward the front of the camera from a completely retracted state inside the camera, a brush 8 which is secured to the first support frame 3 slides on top of a switch substrate 7 secured to the first moveable frame 4. A pair of conductive patterns are formed on the surface of the switch substrate 7 (shown by the region of hatching in FIG. 1), and when the brush 8 passes along the conductive patterns, the output signals from switch substrate 7 change from a high (H) level to a low (L) level.

Cam followers 13 and 14 are attached to the second support frame 12 and the first support frame 3, respectively. The cam followers 13 and 14 pass through forward guide grooves 16a of a securing barrel 16 and mate with cam grooves 15a and 15b, respectively, of the cam barrel 15. A zoom motor M2 drives the lens groups 1 and 2 in the direction of the optical axis to change the focal point distance of the photographic optical system. The rotation of the zoom motor M2 is transmitted to a peripheral gear 15c of the cam barrel 15 through a gear 17, and the cam barrel 15 rotates around the optical axis following the lead of cam grooves 15a and 15b.

A switch substrate 19 is wound around the outer periphery of the cam barrel 15. When the cam barrel 15 rotates, a brush 18 slides on the switch substrate 19. As shown in an expanded view of the switch substrate 19 and brush 18 at the bottom of FIG. 1, a pair of conductive patterns (represented by regions of hatching) are formed on the switch substrate 19. When the pair of conductive patterns slide across the brush 18, the output signals from the switch substrate 19 change from the H level to the L level. A slit disk 20 is attached to the opposite side of the gear 17 of the zoom motor M2, and pulse array signals corresponding to the amount of rotation of the zoom motor M2 are output from a photointerrupter 21.

The camera also includes a distance measurement device 22, a viewfinder cam 23 having cam grooves 23a and 23b, a viewfinder objective lens 24, a condenser lens 27, a viewfinder ocular lens 26, and a liquid crystal panel 25 that is arranged on the primary image focusing surface. As will be described in detail below, distance information is displayed within a viewfinder with the liquid crystal panel 25. The objective lens 24 includes two lens groups, and followers 24a and 24b provided on each lens group match with the cam grooves 23a and 23b of the viewfinder cam 23. The viewfinder cam 23 is connected with the gear 15c of the cam barrel 15 through a gear array 28, and rotates in connection with the cam barrel 15. An operation to change the magnification of the viewfinder is executed by changing the gap between the groups of the viewfinder objective lens 24 using the rotation of the viewfinder cam 23. A camera body 30, and a pressure plate 31 hold film 32 within a plane.

Figure 2:
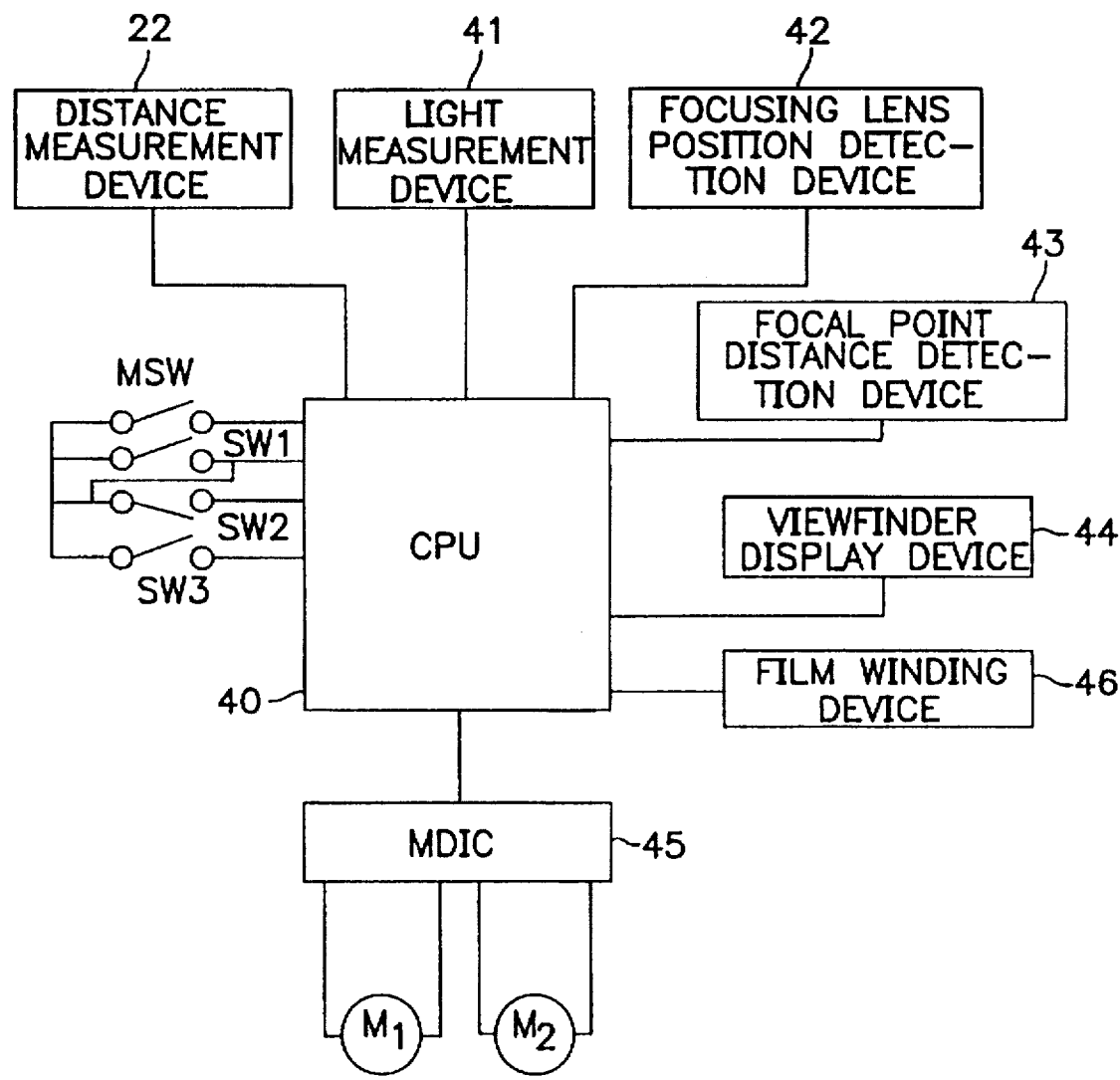
FIG. 2 is a block diagram of a control system of the camera in accordance with the first embodiment of the present invention.

FIG. 2 is a block diagram of a camera control system in accordance with the first embodiment of the present invention. The control system includes a control unit 40 which includes a microcomputer and the peripheral devices necessary for its operation, such as a memory. Various devices associated with camera operation are connected to the control unit 40 including the distance measurement device 22 described above, a light measurement device 41 to detect the subject brightness, a focusing lens position detection device 42 (hereinafter referred to as a "lens position detection device"), a focal point distance detection device 43, a viewfinder display device 44, a motor drive integrated circuit (MDIC) 45 which drives motors M1 and M2, and a film winding device 46 which feeds the film 32.

The distance measurement device 22 is a so-called active system device which detects the subject distance based on a subject position determined by emitting infrared light toward the targeted subject and receiving the reflected light. The position of the first lens group 1 is controlled based on the subject distance detected by the distance measurement device 22 and a distance step table shown in FIG. 3A and described in more detail below. The specified distance information is displayed by the viewfinder display device 44, as will be described in detail below.

The lens position detection device 42 includes the photointerrupter 5 and the switch substrate 7 described above with reference to FIG. 1. The lens position detection device 42 outputs a pulse count number corresponding to the position of the first lens group 1. Specifically, the lens position detection device 42 counts the number of pulses output by the photointerrupter 5 after the signal output from the switch substrate 7 changes from the H level to the L level.

The focal point distance detection device 43 includes the switch substrate 19 and the photointerrupter 21 described above with reference to FIG. 1. The focal point distance detection device 43 outputs a pulse count number corresponding to the focal point distance of the photographic optical system. Specifically, the focal point distance detection device 43 counts the number of pulses output by the photointerrupter 21 which is based on the position at which the signal output from switch substrate 19 changes from the H level to the L level.

The viewfinder display device 44 includes the liquid crystal display panel 25 described above and a drive circuit (not shown).

Several switches are also connected to the control unit 40. These switches include a power source switch MSW, a half-push switch SW1 which is turned on by a half-push manipulation of a release button (not shown), a full-push switch SW2 which is turned on by a full-push manipulation of the release button, and a telescopic switch SW3 which is turned on in response to the operation of pressing a telescopic button (not shown).

FIG. 3A is a distance step table which correlates the photographic distance of the photographic subject (i.e., the photographic subject distance which is brought in-focus by the photographic optical system) and the number of photointerrupter 5 output pulses which are output from lens position detection device 42. Focus steps 1 through n in the left column of the distance step table correspond to positions at which the first lens group 1 is stopped. Focus step 1 corresponds to a position of the first lens group 1 at which the number of output pulses from lens position detection device 42 is one (1). Specifically, focus step 1 corresponds to the position of the first lens group at which one (1) pulse is output from photointerrupter 5 after the output signal from switch substrate 7 has switched from the H level to the L level.

The photographic distance of the photographic subject corresponding to focus step 1 is $L_1$, shown in the second column of the distance step table. Focus step 2 corresponds to the position of the first lens group 1 at which the number of output pulses from lens position detection device 42 is two (2), and the photographic distance is $L_2$. Focus step 3 corresponds to the position of the first lens group 1 at which the number of output pulses from lens position detection device 42 is three (3), and the photographic distance is $L_3$. Similarly, focus steps 4 through n correspond to the position of the first lens group 1 at which the number of output pulses from the lens position detection device is 4 through n, respectively, and the photographic distances at these times are $L_4$–$L_n$. As shown in FIGS. 3B and 3C, the photographic distance $L_1, L_2, L_3 \ldots L_i \ldots L_n$ decreases as n increases. Thus, the photographic distance $L_1$ corresponds to the largest photographic distance from the distance step table.

Focus step 1 of FIG. 3A corresponds to a photographic distance $L_1$ which is outside the distance measurement range of the distance measurement device 22. Focus step 1 is set when the telescopic switch SW3 is on, and the first lens group 1 is controlled to a position corresponding to a telescopic operation. Focus steps 2 through n are within the distance measurement range of the distance measurement device 22.

As shown in FIG. 3B, switch distances $C_3$–$C_n$ are set between photographic distances $L_2$–$L_n$, respectively, which correspond to focus steps 2 through n. The control unit 40 determines the position at which the first lens group 1 is stopped by comparing the distance measurement value of the distance measurement device 22 and the respective switch distance $C_3$–$C_n$. For example, when the measured distance value of the distance measurement device 22 is larger than a switch distance $C_3$ that is set between the photographic distances $L_2$ and $L_3$, the photographic distance $L_2$ is selected, and the first lens group 1 is stopped at the position at which the number of output pulses of lens position detection device 42 is two (2). When the measured distance value is between switch distances $C_3$ and $C_4$, the photographic distance $L_3$ is selected, and the first lens group 1 is stopped at the position at which the number of output pulses of lens position detection device 42 is three (3). In the same manner, when the measured distance value is between switch distances $C_{i-1}$ and $C_i$, the photographic distance $L_{i-1}$ is selected, and the first lens group 1 is stopped at the position at which the number of output pulses of lens position detection device 42 is i−1. The switch distances $C_3$, $C_4$, \ldots, $C_n$ divide the photographic distance range which can be achieved by the photographic optical system into a plurality of distance ranges or regions into which the photographic distances $L_2$–$L_n$ fall.

Figure 4:
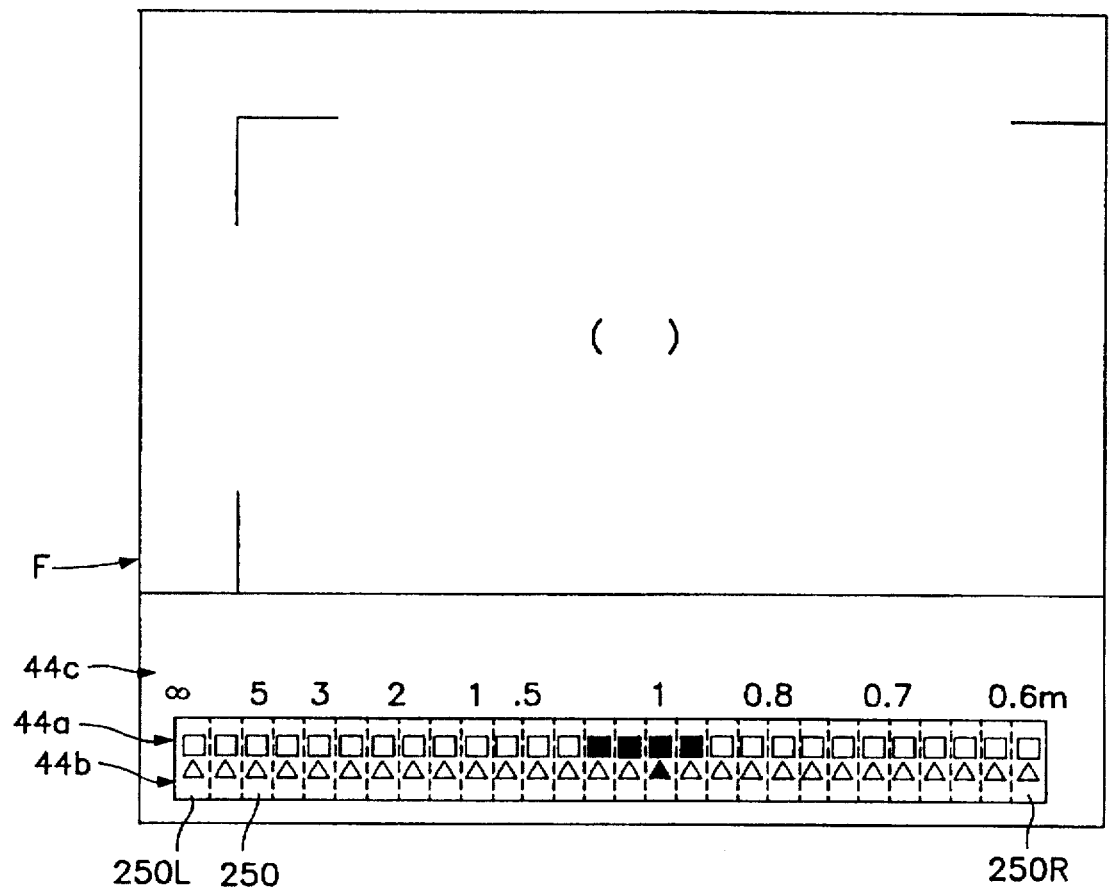
FIG. 4 shows an example of a viewfinder display inside a camera in accordance with the first embodiment of the present invention.

FIG. 4 shows an example of a viewfinder display screen inside the viewfinder of the viewfinder display device 44. In the example shown in FIG. 4, twenty-eight (28) liquid crystal segments 250L–250R which correspond in number to the number of focus steps 1-n of the focus step table of FIG. 3A are arranged on the bottom of the viewfinder display screen. Thus, since there are twenty-eight liquid crystal segments in the example of FIG. 4, the number of focus steps n in this example is twenty-eight. The respective liquid crystal display segments 250L–250R include two sections, a subject depth of field display section 44a displaying the subject depth of field (square display sections in FIG. 4), and a photographic distance display section 44b displaying the photographic distance (triangular display sections in FIG. 4). Further, the dotted lines in FIG. 4 represent the transition positions between the respective liquid crystal segments 250L–250R.

The liquid crystal display segments from liquid crystal segment 250L on the far left side of the display through liquid crystal segment 250R on the far right side of the display correspond to focus steps 1-n, respectively, of FIG. 3A. The photographic distance $L_1$-$L_{28}$ corresponding to each of the twenty-eight liquid crystal segments 250L-250R is specified in the distance step table of FIG. 3A, and the numerical values representing these photographic distances are displayed on a scale 44c above the display segments 250L-250R. In the example shown in FIG. 4, the photographic distances range from 0.6 m (meters) to ∞ (infinity) on the display scale 44c.

When a photographic distance L corresponding to the distance value measured by the distance measurement device 22 is determined from the distance step table of FIG. 3A, as described above, the control unit 40 displays the determined photographic distance on the photographic distance display section 44b of the viewfinder display. In the example shown in FIG. 4, the photographic distance display section 44b of a liquid crystal segment 250 corresponding to focus step number 16 is lit, and the corresponding photographic distance can be judged to be 1 m from the photographic distances displayed on the scale 44c.

The subject depth of field is derived based on the values below, and the result is displayed on the subject depth of field display section 44a.

L: photographic distance (mm)

f: focal point distance (mm) of the photographic optical system

σ: minimum blur circle diameter (mm)

F: F value of the photographic optical system

The photographic distance L can be specified from the distance value measured by the distance measurement device 22 or from the distance step table of FIG. 3A. The focal point distance f can be determined by the information from focal point distance detection device 43 of FIG. 2, and the minimum blur circle σ can be preset in the control unit 40. The F value of the photographic optical system may be set manually by the photographer, or the camera may identify an automatically set value.

For example, when the photographic distance L is 1 m, the subject depth of field is taken to be approximately 872 mm–1170 mm. As shown in FIG. 3C, if the photographic distance $L_{13}$ corresponding to focus step 13 is 1197 mm, and the photographic distance $L_{14}$ of focus step 14 is 1117 mm, and switch distance $C_{14}$ between focus steps 13 and 14 is 1156 mm, then the maximum value of the subject depth of field 1170 mm corresponds to focus step 13. Moreover, if the photographic distance $L_{18}$ of focus step 18 is 886 mm, and the photographic distance $L_{19}$ of focus step 19 is 844 mm, and the switch distance $C_{19}$ between focus steps 18 and 19 is 864 mm, then the minimum value of the subject depth of field 872 mm corresponds to focus step 18.

However, if the subject depth of field display sections corresponding respectively to focus steps 13 and 18 of subject depth of field display 44a are lit, there is the concern that the photographer may make the mistake of thinking that the subject depth of field from the minimum value 864 mm corresponding to focus step 18 (less than the subject depth of field 872 mm) up to the maximum value corresponding to focus step 13 (larger than the subject depth of field 1170 mm) is the subject depth of field. Thus, only the subject depth of field display sections corresponding to focus steps 14-17 from among the subject depth of field display sections 44a are lit.

Figure 7:
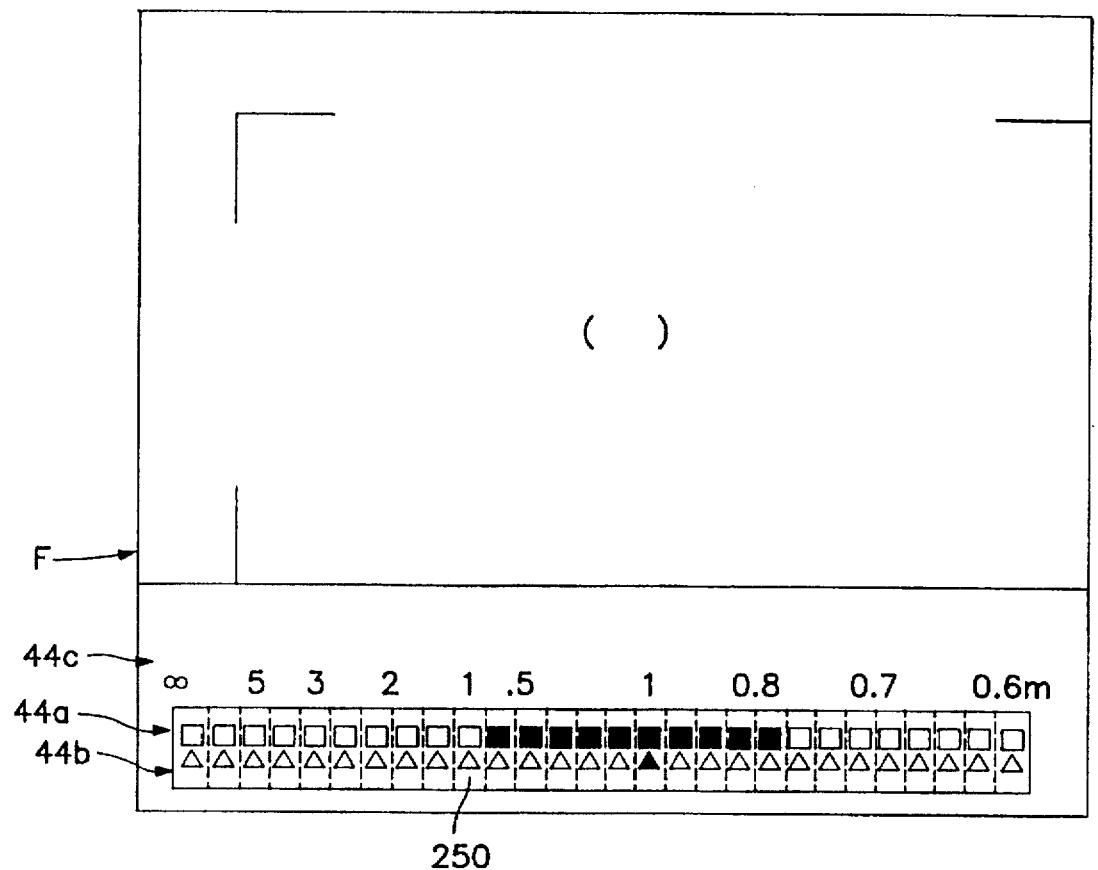
FIG. 7 shows an example of a viewfinder display in accordance with embodiments of the present invention when an F value of the photographic optical system is changed to a larger value than the F value of the photographic optical system corresponding to the viewfinder display of FIG. 4.

An example of a display when the F value of the photographic optical value is changed to eleven (11) and the subject depth of field has increased is shown in FIG. 7.

Figure 5:
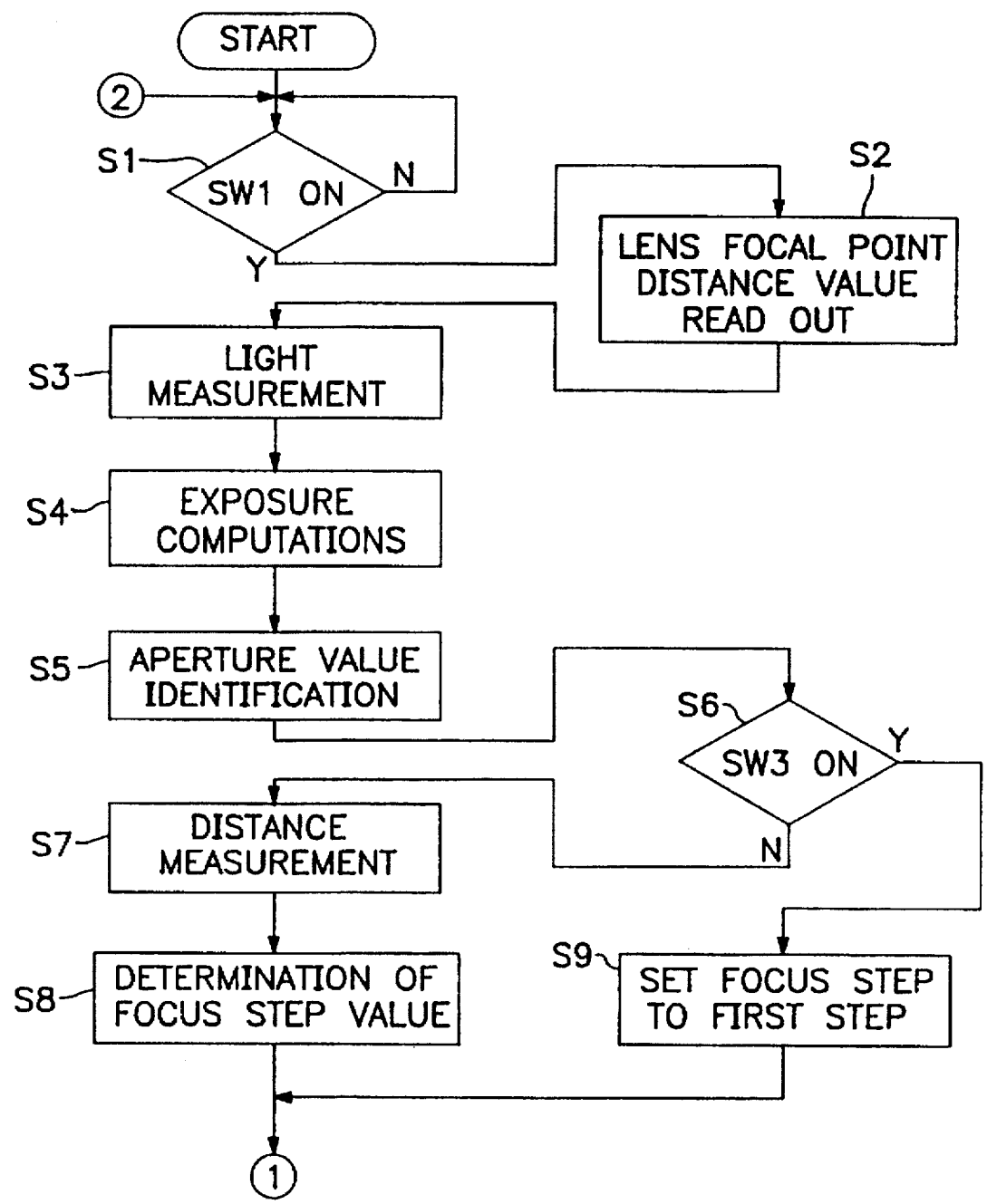
FIGS. 5 and 6 are flow charts showing an operational process for performing photographic control with a camera in accordance with the first embodiment of the present invention.

A photographic control operational process for displaying distance information and depth of field information in accordance with the first embodiment of the present invention will be explained below with reference to FIGS. 5 and 6. The operational process starts when the power source switch MSW (shown in FIG. 2) is turned on and the control unit 40 initiates the operational process. In step S1, it is determined whether or not the half-push switch SW1 is on. If the switch SW1 is off, step S1 is repeated until it is determined that switch SW1 is on. If the half-push switch SW1 is on, the number of pulses output by the focal point distance detection device 43 is read (step S2). Next, in step S3, light measurement is performed by the light measurement device 41, and exposure control computations are executed (step S4) using the light measurement results.

Continuing in step S5, an aperture value is identified. The aperture value may be manually set by the photographer or may be computed in step S4. When the aperture value is manually set, the manually set value is read in step S5, and when the aperture value is computed in step S4, the computed value is read in step S5. Continuing in step S6, it is determined whether or not the telescopic switch SW3 is on. If the telescopic switch SW3 is off, the operational process advances to step S7, and the subject distance is measured by the distance measurement device 22. Then, in step S8, the focus step corresponding to the measured distance value is determined from the distance step table of FIG. 3A. If the telescopic switch SW3 is on in step S6, the operational process advances to step S9, and the focus step is set to 1.

Figure 6:
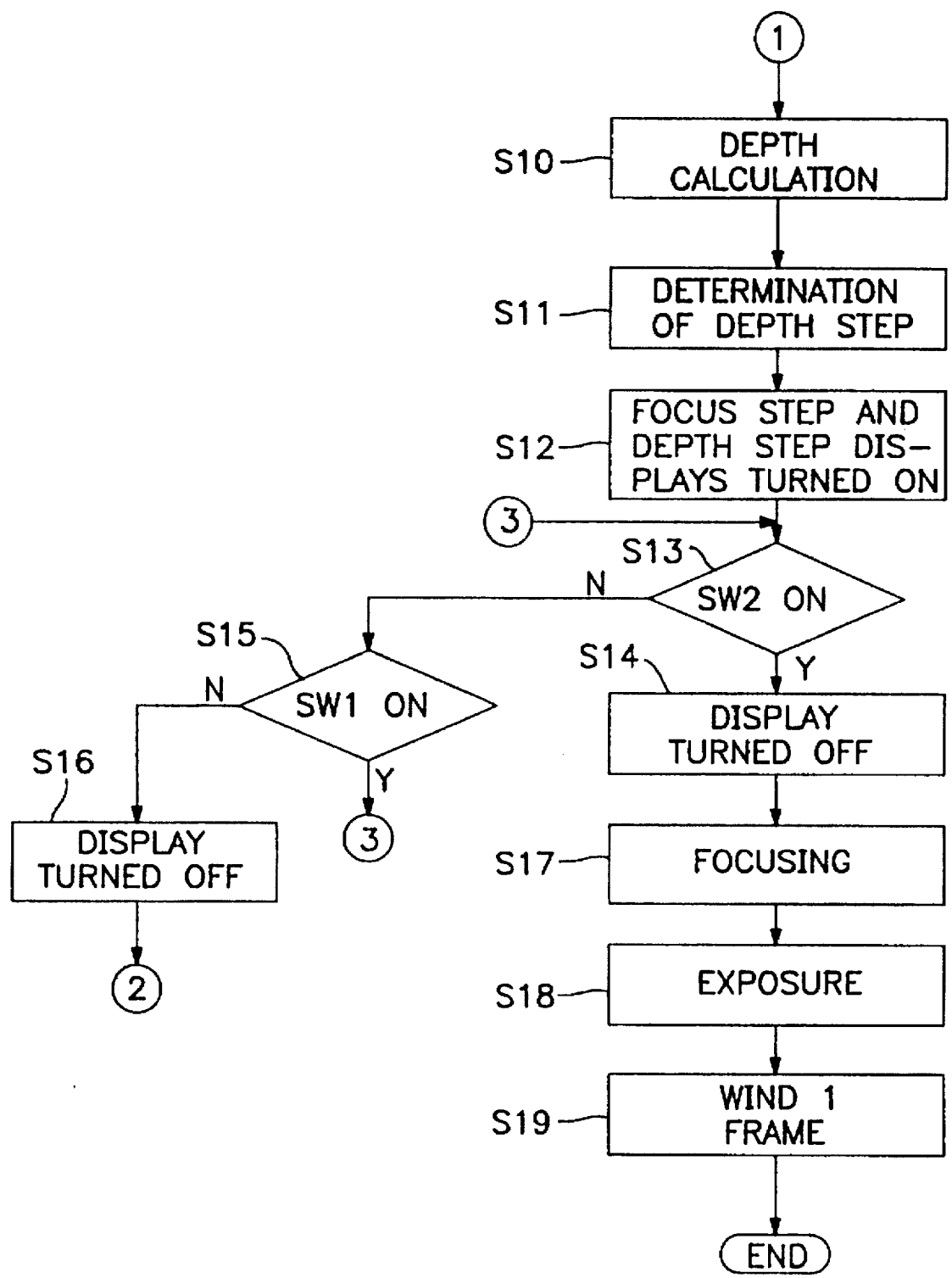

After either of step S8 or step S9, the operational process advances to step S10 in FIG. 6, and the subject depth of field is computed based on the focal point distance information read in step S2, the aperture value information determined in step S5, and the photographic distance corresponding to the focus step value determined in step S8. Next, in step S11, the focus steps which correspond to the computed subject depth of field are determined to be the depth step. At this time, if the focus steps include even a part of the photographic distance range outside the subject depth of field, these steps are eliminated from the depth step, as described above. Next, in step S12, the photographic distance display section 44b and subject depth of field display section 44a (shown in FIG. 4) which correspond, respectively, to the focus step determined in step S8 and the depth steps determined in step S11 are lit, and the photographic distance and the subject depth of field are displayed to the photographer.

In step S13, it is determined whether or not the full-push switch SW2 is on. If the full-push switch SW2 is on, the operational process advances to step S14, and the displays of the photographic distance display section 44b and subject depth of field display section 44a are turned off. If full-push switch SW2 is off in step S13, the operational process advances to step S15, and it is determined whether or not the half-push switch SW1 is on. If the half-push switch SW1 is on, the operational process returns to step S13, and, if the half-push switch SW1 is off, the photographic distance display section 44b and subject depth of field display section 44a are extinguished at step S16. The operational process then returns to step S1. In step S17, (continuing from step S14), the first lens group 1 is driven until the number of pulses corresponding to the focus step determined at step S8 is output from lens position detection device 42. An exposure operation is then executed in step S18. After exposure is complete, the operational process advances to step S19, and processing is completed by winding one frame of film 32 with the film winding device 46.

Figure 8:
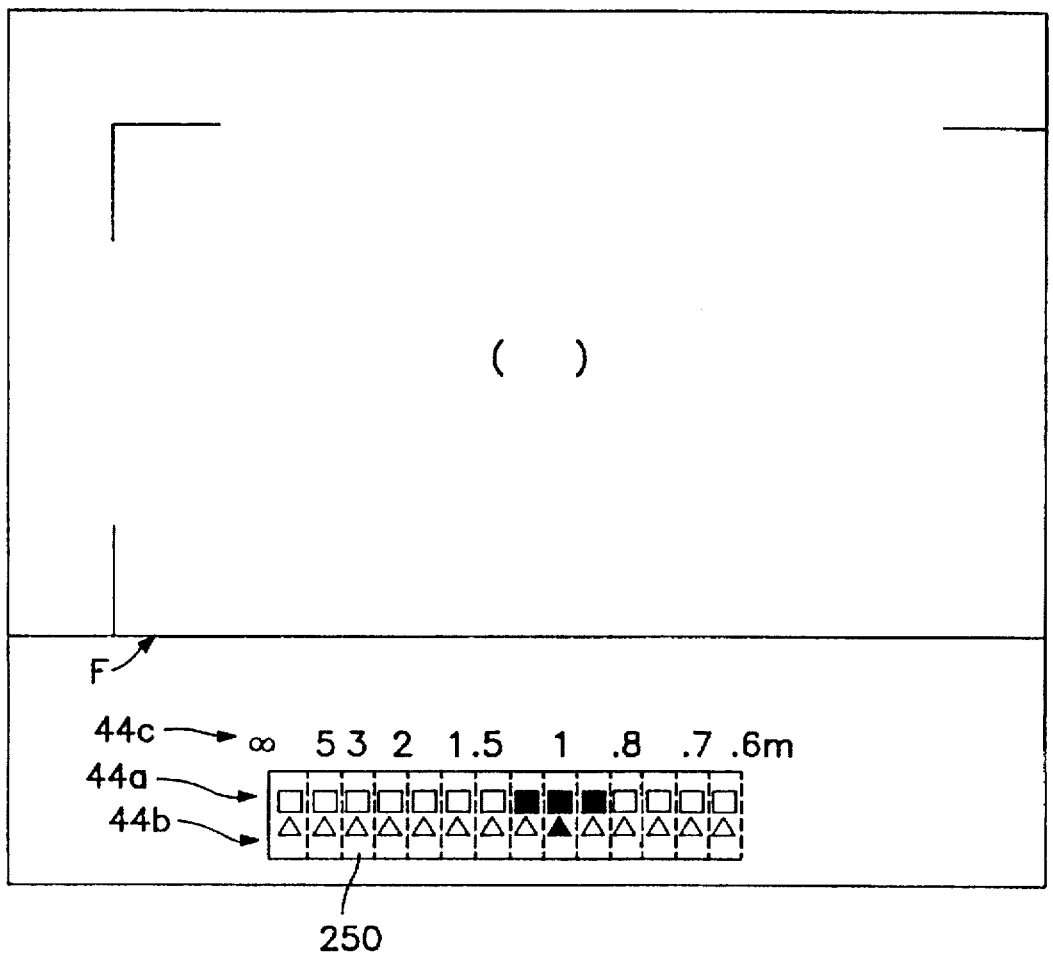
FIG. 8 shows an example of a viewfinder display in accordance with embodiments of the present invention having half as many display segments as the example of the viewfinder display shown in FIG. 4.

Further, in accordance with the embodiments of the invention described with reference to FIGS. 1-7, the number of divisions of the display segments displaying photographic distance 44b and subject depth of field 44a is equal to the number of focus steps; however, if the number of focus steps may be set to an integer multiple of the number of divisions of the display area, and the relationship between the number of focus steps and divisions of the display segments may be suitably modified. For example, FIG. 8 shows a display in which the number of liquid crystal segments 250 is fourteen (14) and the number of focus steps n=28. When determining the lit position of the photographic distance display section 44b and the lit range of the subject depth of field display section 44a, the same type of display operation described above can be executed if one liquid crystal segment 250 corresponds to two focus steps.

Figure 9:
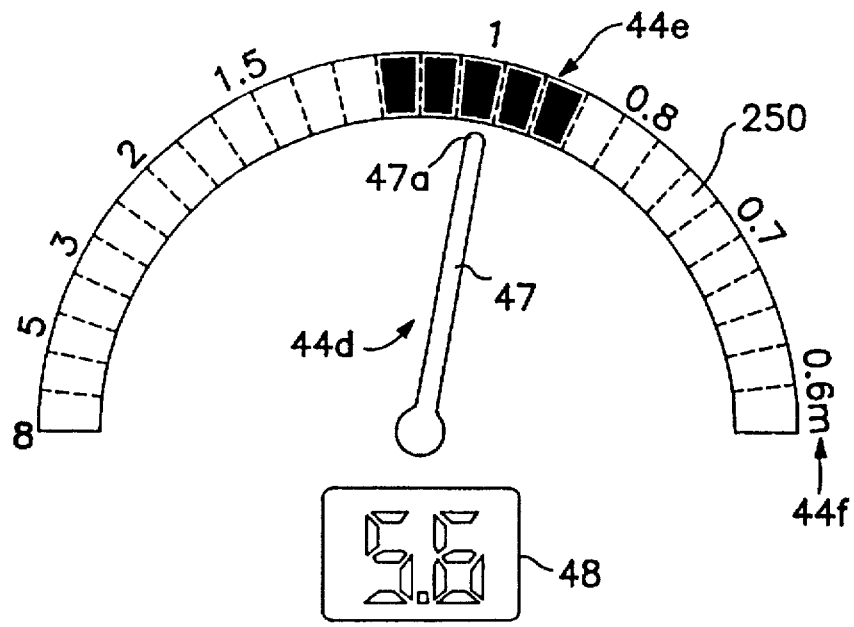
FIG. 9 shows an example of a display in accordance with embodiments of the present invention having a rotating pointer to display the same information as displayed in the viewfinder display of FIG. 4.
Figure 10:
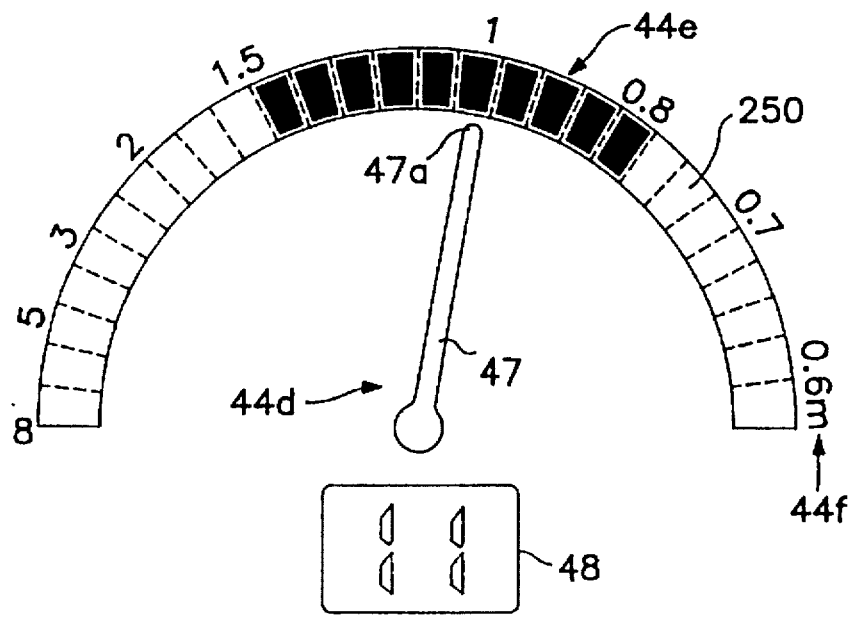
FIG. 10 shows an example of a display in accordance with embodiments of the present invention when the F value of the photographic optical system is a value larger than the F value of the photographic optical system corresponding to the display of FIG. 9.

Further, FIGS. 9 and 10 show an example of a display in which a photographic distance information display section 44d is comprised of a rotational needle 47, and a subject depth of field display section 44e including liquid crystal segments 250 along the moveable path of an end 47a of the rotational needle 47. A distance scale 44f is provided on the outside of the depth of field display section 44e. Control of the range of the subject depth of field display section 44e which is lit is performed in the same manner as described above with respect to the display shown in FIG. 4. Further, in the display examples shown in FIGS. 9 and 10, the F value of the photographic optical system is displayed on a separate display 48. As shown in FIGS. 9 and 10, a photographer can easily discern that the display of FIG. 10, which is set at F11, has a wider subject depth of field than the display of FIG. 9 set at F5.6.

Figure 11:
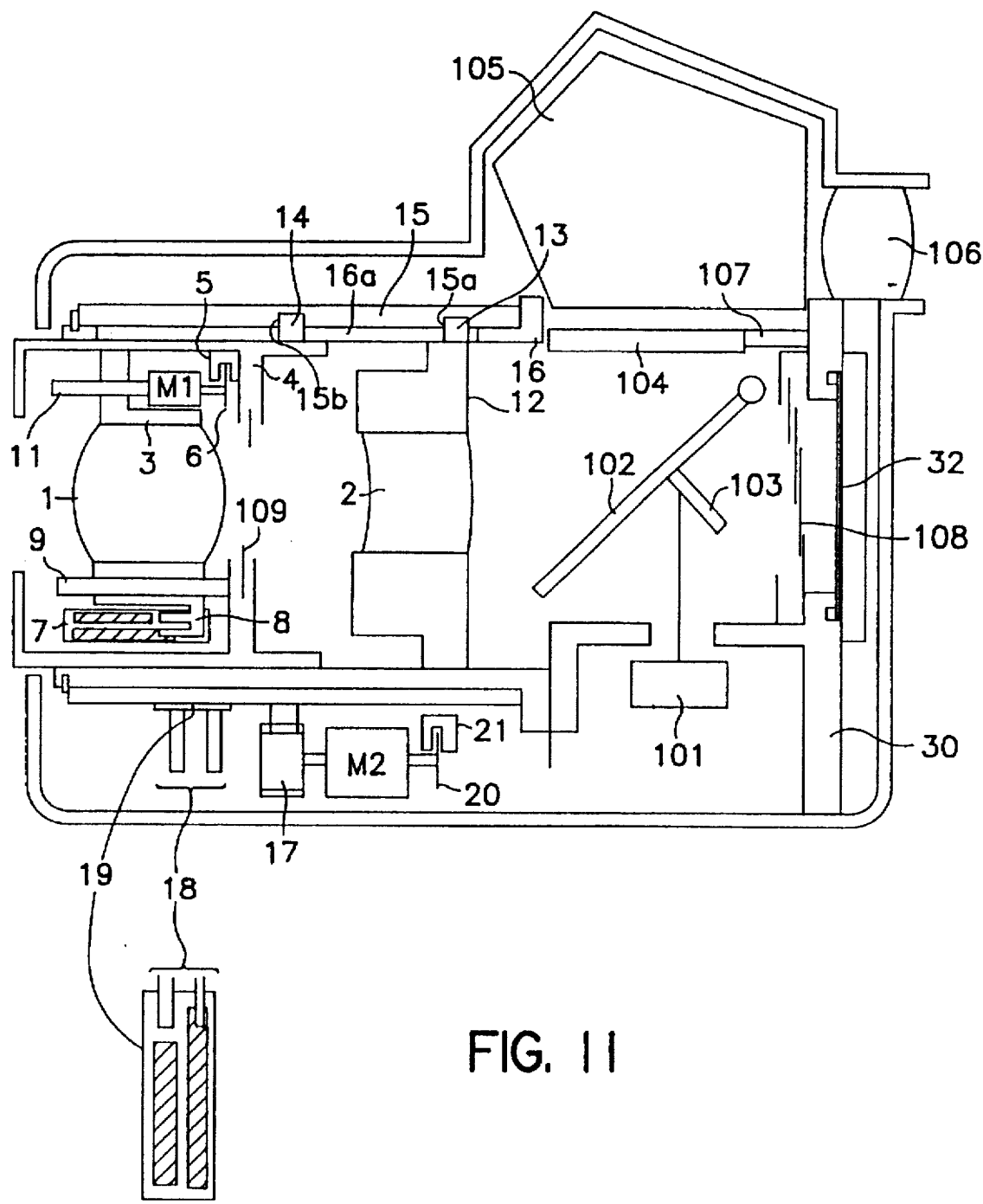
FIG. 11 is a side view of an interior configuration of a camera in accordance with a second embodiment of the present invention.

A second embodiment of the present invention will now be explained with reference to FIGS. 11–14. FIG. 11 is a side view showing the interior configuration of a camera in accordance with the second embodiment of the present invention. Like elements in the first and second embodiments are referred to by like reference numerals.

The camera shown in FIG. 11 is a so-called passive type single lens reflex camera. The passive type single lens reflex camera leads the subject light that has passed through the various regions of the exit pupil plane of the photographic optical system to a focal point detection device 101. The focal point detection device 101 detects an amount of shift of the photographic optical system required to bring the photographic optical system to an in-focus position from the current position of the photographic optical system in relation to the targeted subject (hereinafter referred to as the amount of defocus).

A main mirror 102 leads the photographic light fluxes that exit from the second lens group 2 to a viewfinder optical system. A sub-mirror 103 leads the light fluxes that have passed through main mirror 102 to the focal point detection device 101. A focal point plate 104 is arranged in a transmittance position with the light sensitivity plane of film 32. A prism 105 leads the subject light focused on focal point plate 104 to a viewfinder ocular lens 106. A liquid crystal panel 107 displays distance information within the viewfinder. The liquid crystal panel 107 displays information in the same manner as the display shown in FIG. 4. The camera also includes a shutter 108, and an aperture 109.

Figure 12:
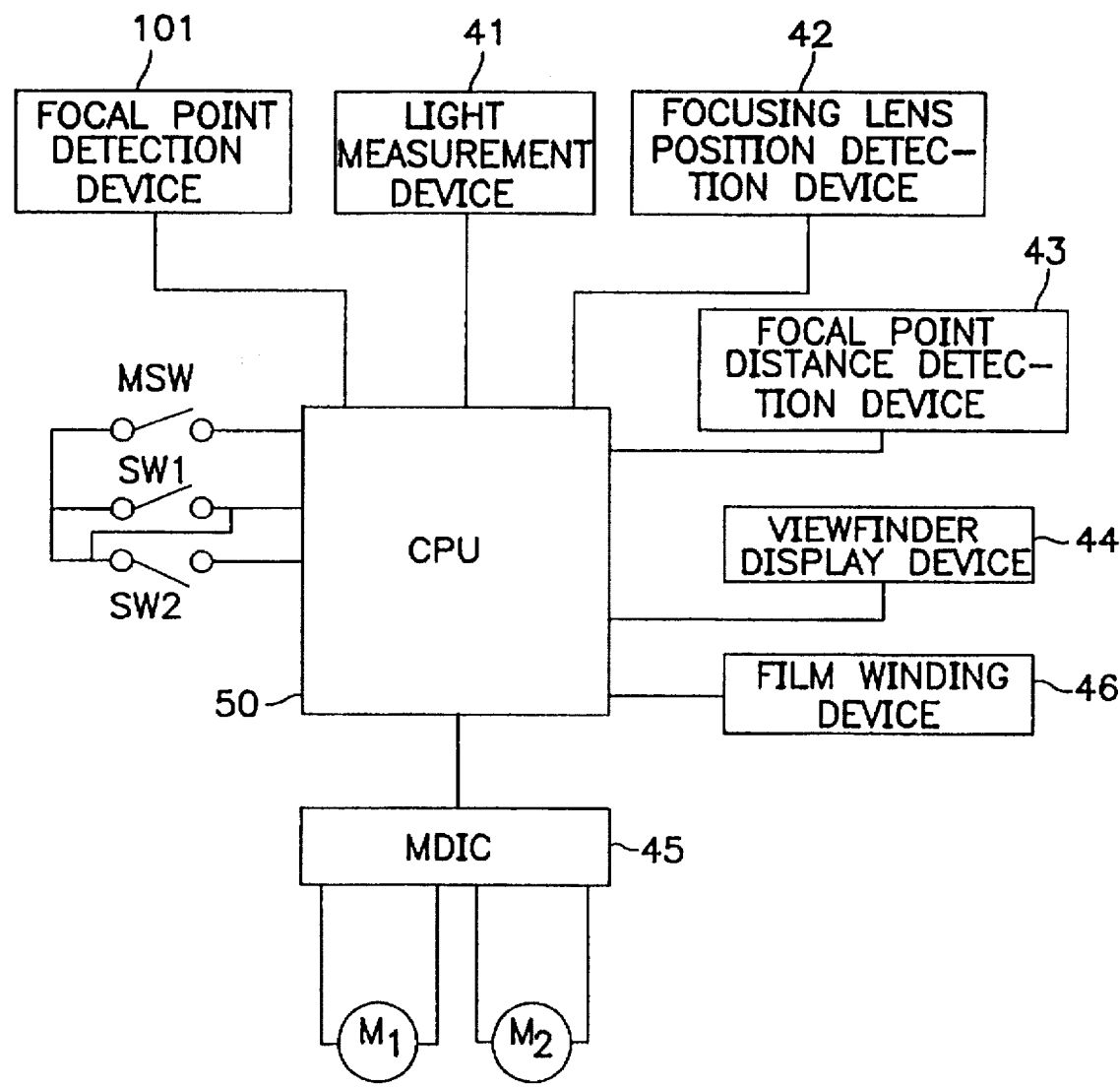
FIG. 12 is a block diagram of a control system of the camera in accordance with the second embodiment of the present invention.

FIG. 12 is a block diagram of a control system of the camera in accordance with the second embodiment of the present invention. A control unit 50 including a microcomputer and the peripheral devices necessary for operation, such as a memory, controls the camera operations. Various camera devices are connected to the control unit 50 including the focal point detection device 101 (described above),
a light measurement device 41, a lens position detection device 42, a focal point distance detection device 43, a viewfinder display device 44, a motor drive integrated circuit (MDIC) 45 which drives motors M1 and M2, a film winding device 46 which feeds film 32, a power source switch MSW, a half-push switch SW1, and a full-push switch SW2.

In accordance with the second embodiment of the invention, the subject distance cannot be directly detected with the focal point detection device 101 as was done with the distance measurement device 22 in the first embodiment of the invention described above. Thus, in accordance with the second embodiment of the invention, the photographic distances $L_1-L_n$ are determined from the number of output pulses of the lens position detection device 42 and the distance step table of FIG. 3A, and the subject depth of field is derived using the photographic distance determined in this manner.

An operational process for performing photographic control in accordance with the second embodiment of the present invention will now be described with reference to FIGS. 13 and 14. When the power source switch MSW shown in FIG. 12 is turned on, the operational process of FIGS. 13 and 14 starts. First, in step S101, it is determined whether or not the half-push switch SW1 is on. If the half-push switch SW1 is off, the decision in step S101 is repeated until the half-push switch SW1 is on. If the half-push switch SW1 is on, in step S102 the number of output pulses of focal point distance detection device 43 is read. Next, in step S103, light measurement is performed by the light measurement device 41. The amount of defocus is then computed from the output signals of the focal point detection device 101 (step S104) and, based on the computed amount of defocus, it is determined whether or not the photographic optical system is in the not-in-focus state (step S105).

If it is determined that the photographic optical system is in the not-in-focus state, the operational process advances to step S106, and the first lens group 1 is driven to an in-focus position by the motor M1. Continuing, in step S107, it is determined whether or not the full-push switch SW2 is on. If the full-push switch SW2 is on, even if the photographic optical system is in the not-in-focus state, the lens drive by motor M1 is stopped in step S108, the mirror is lifted upward (step S109), the aperture 109 within the photographic lens is driven (step S110) to the position corresponding to the results of the light measurement performed in step S103, and exposure is conducted (step S111) by driving the shutter 103 to open and close. After opening and closing the shutter 103, the operational process is completed in step S112 by winding one frame of film 32.

If the full-push switch SW2 is off in step S107, the operational process advances to step S113, and it is determined whether or not the half-push switch SW1 is on. If the half-push switch SW1 is on, the operational process returns to step S103, and if the half-push switch SW1 is off, the drive of the first lens group 1 by the motor M1 is stopped (step S114), and the operational process returns to step S101.

Figure 14:
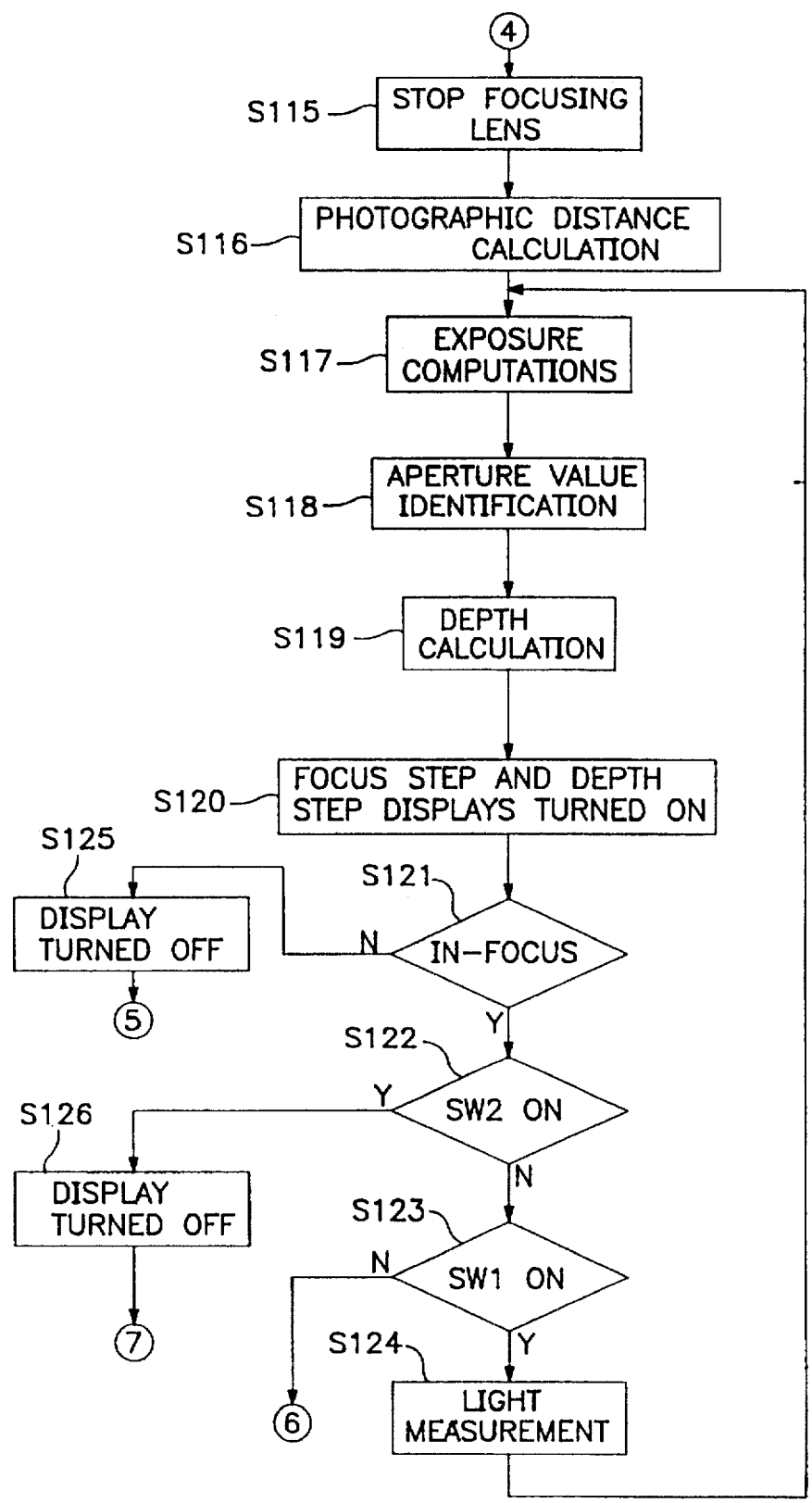

In step S105, if it is determined that the photographic optical system is in the in-focus state, the operational process advances to step S115 in FIG. 14, and drive of the first lens group 1 by the motor M1 is stopped. Continuing, in step S116, the photographic distance is computed from the number of output pulses from the lens position detection device 42 and from the distance step table of FIG. 3A. Next, in step S117, the computations necessary for exposure are performed using the light measurement results of step S103. The aperture value is determined in step S118. If the camera is set in aperture priority mode at this time, the aperture value is a value set manually by the photographer. If the camera is set in the program mode or the shutter speed priority mode, the aperture value is set to a value computed in step S117. Therefore, the identification of the aperture value is changed correspondingly to the exposure mode. Continuing, in step S119, the subject depth of field is computed based on the focal point distance read in step S102, the photographic distance derived in step S116, and the aperture value identified in step S118.

In step S120, the display segments are lit in the photographic distance display section 44b and subject depth of field display section 44a (shown in FIG. 4) which correspond, respectively, to the photographic distance derived at step S116 and the subject depth of field calculated at step S119. The photographic distance and the subject depth of field are thereby displayed to the photographer. Further, as described with respect to the first embodiment of the present invention, the display sections which include a photographic distance outside the subject depth of field can be made not to light. Next, in step S121, the in-focus state is confirmed. If the photographic optical system is in the in-focus state, it is determined whether or not the full-push switch SW2 is on (step S122). If the full-push switch SW2 is off, it is determined whether or not the half-push switch SW1 is on (step S123). If the half-push switch SW1 is on, light measurement is executed in step S124 and the operational process returns to step S117. The above-described processing changes the display of the subject depth of field by connecting it to the changes of aperture value.

Figure 13:
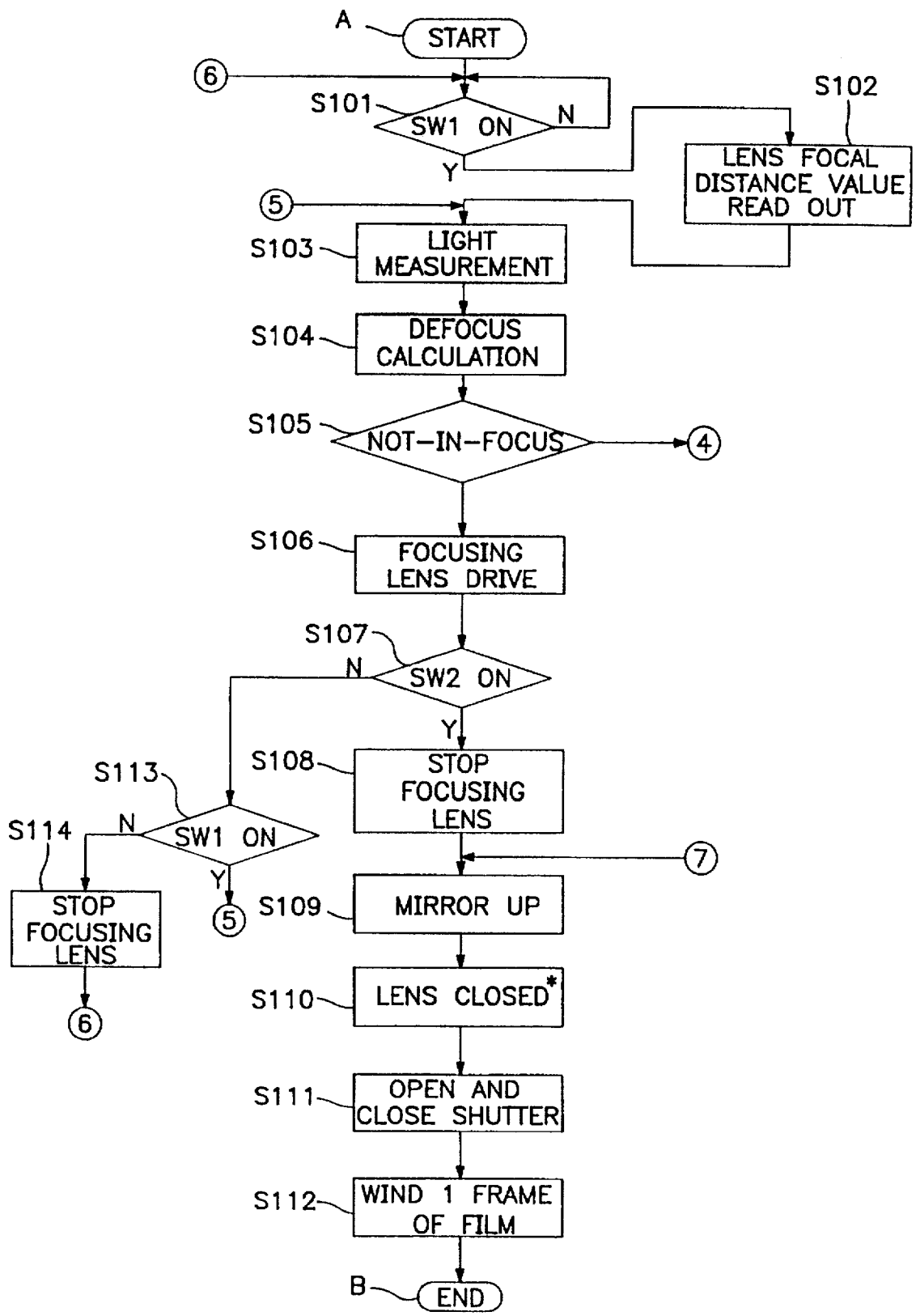
FIGS. 13 and 14 are flow charts showing a photographic operational process executed by the camera in accordance with the second embodiment of the present invention.

If the photographic optical system is in the not-in-focus state in step S121, the operational process advances to step S125, the current display of the photographic distance display section 44b and the subject depth of field display section 44a are extinguished, and the operational process returns to step S103 in FIG. 13. At step S122 in FIG. 14, if the full-push switch SW2 is on, the operational process advances to step S126, the display of photographic distance display section 44b and subject depth of field display section 44a are extinguished, and the operational process proceeds to step S109 in FIG. 13. If the half-push switch SW1 is off in step S123 of FIG. 14, the operational process returns to step S101 in FIG. 13.

In addition, it is noted that the various different types of displays shown in FIGS. 8–10 can also be applied to the second embodiment of the invention.

As described above, in accordance with embodiments of the present invention, correct distance information can be easily displayed in both an active distance measurement type camera and a passive type camera, based on photographic distance information obtained during the focusing control process for the photographic optical system. Further, in accordance with embodiments of the present invention, the subject depth of field can be easily displayed, and the reliability of the subject depth of field display can be improved without the fear that the depth of field information displayed will indicate a subject depth of field which is a wider range than the actual subject depth of field.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A display device for a camera, comprising:
   a photographic optical system having a photographic distance range;
   a focusing control device to focus the photographic optical system on a photographic subject;
   a distance region identification device to identify a distance region within the photographic distance range to which a distance to the photographic subject belongs according to the focusing control performed by the focusing control device, wherein the photographic distance range of the photographic optical system is divided into a plurality of predetermined distance regions; and
   a distance information display device having a plurality of display segments corresponding to the plurality of predetermined distance regions, wherein the distance information display device displays the distance to the photographic subject by modifying a display segment corresponding to the distance region identified by the distance region identification device.

2. A display device as recited in claim 1, wherein the number of predetermined distance regions is set to an integer multiple of the number of display segments.

3. A display device as recited in claim 1, wherein the focusing control device comprises a distance measurement device to measure a distance to the photographic subject, and the distance region identification device identifies the distance region within the photographic distance range according to the distance measured by the distance measurement device.

4. A display device as recited in claim 1, wherein the focusing control device comprises:
   a focal point detection device to detect a defocus amount of the photographic optical system with respect to the photographic subject; and
   a drive device to drive the photographic optical system to a focused position based on the defocus amount detected by the focal point detection device,
   wherein the distance region identification device identifies the distance region to which the distance to the photographic subject belongs according to the focused position of the photographic optical system.

5. A display device as recited in claim 1, further comprising:
   a depth of field computation device to compute a depth of field of the photographic subject; and
   a depth of field display device to identify a group of display segments from the plurality of display segments that correspond to the depth of field computed by the depth of field computation device.

6. A display device as recited in claim 5, wherein the depth of field computation device comprises:
   an aperture value identification device to identify an aperture value of the photographic optical system; and
   a focal point distance identification device to identify a focal point distance of the photographic optical system,
   wherein the depth of the field computation device computes the depth of field based on the aperture value identified by the aperture value identification device, the focal point distance identified by the focal point distance identification device and the photographic distance information obtained during focus control of the photographic optical system.

7. A display device as recited in claim 5, wherein the depth of field display device eliminates from the group of display segments displaying the depth of field, those display segments which represent a photographic distance both within the computed depth of field and outside the computed depth of field.

8. A camera display device, comprising:

a distance measurement device to measure a distance to a photographic subject;

a photographic optical system having a photographic distance range;

a distance region identification device to identify a distance region within the photographic distance range to which a distance to the photographic subject belongs, wherein the photographic distance range of the photographic optical system is divided into a plurality of predetermined distance regions;

a focusing device to drive the photographic optical system based on the distance region identified by the distance region identification device;

an aperture value identification device to identify an aperture value of the photographic optical system;

a focal point distance identification device to identify a focal point distance of the photographic optical system;

a depth of field computation device to compute a subject depth of field based on the aperture value information identified by the aperture value identification device, the focal point distance information identified by the focal point distance identification device, and the photographic distance information obtained from one of the distance measurement device and the distance region identification device;

a distance information display device having a plurality of display segments corresponding to the plurality of predetermined distance regions, wherein the distance information display device displays the distance to the photographic subject by modifying a display segment corresponding to the distance region identified by the distance region identification device; and a depth of field display device to identify a group of display segments from the plurality of display segments that corresponds to the depth of field of the photographic subject computed by the depth of field computation device, and to display the computed depth of field by modifying the group of display segments identified by the depth of field display device.

9. A camera display device as recited in claim 8, wherein the number of predetermined distance regions is set to an integer multiple of the number of display segments.

10. A camera display device as recited in claim 8, wherein the depth of field display device eliminates from the group of display segments displaying the depth of field of those display segments which represent a photographic distance both within the computed depth of field and outside the computed depth of field.

11. A camera display device, comprising:

a photographic optical system;

a focal point detection device to detect a defocus amount of the photographic optical system with respect to a photographic subject;

a focusing device to drive the photographic optical system to a focused position based on the information detected by the focal point detection device;

a distance region identification device to identify a distance region within the photographic distance range to which a distance to the photographic subject belongs according to the focused position of the photographic optical system, wherein the photographic distance range of the photographic optical system is divided into a plurality of predetermined distance regions; and a distance information display device having a plurality of display segments corresponding to the plurality of predetermined distance regions, wherein the distance information display device displays the distance to the photographic subject by modifying a display segment corresponding to the distance region identified by the distance region identification device.

12. A distance information display device as recited in claim 11, further comprising:

an aperture value identification device to identify an aperture value of the photographic optical system;

a focal point distance identification device to identify a focal point distance of the photographic optical system;

a depth of field computation device to compute a depth of field of the photographic subject based on the aperture value identified by the aperture value identification device, the focal point distance information from the focal point distance identification device, and the photographic distance information identified by the distance region identification device; and a depth of field display device to identify a group of display segments from the plurality of display segments that corresponds to a depth of field of the photographic subject according to the depth of field computed by the depth of field computation device.

13. A camera, comprising:

a photographic optical system to image a photographic subject, the photographic optical system having a photographic distance range;

a distance region identification device to identify a distance region, within the photographic distance range, at which the photographic subject is located, wherein the photographic distance range is divided into a plurality of predetermined distance regions; and a display device having a plurality of display segments corresponding to the plurality of predetermined distance regions to display the distance to the photographic subject by modifying a display segment corresponding to a distance region identified by the distance region identification device.

14. A camera as recited in claim 13, wherein the distance region identification device comprises a distance measurement device to measure a distance to the photographic subject; and a distance table stored in memory to correlate the measured distance to the photographic subject with a corresponding distance region.

15. A camera as recited in claim 13, further comprising:

a depth of field computation device to compute a depth of field of the photographic subject according to the photographic distance region identified by the distance region identification device; and a depth of field display device to display the computed depth of field.

16. A camera as recited in claim 13, wherein the distance a region identification device comprises:

a focal point detection device to detect an amount of defocus of the photographic optical system with respect to the photographic subject;

a drive to drive the photographic optical system to an in-focus state according to the mount of defocus detected by the focal point detection device;

a lens position detection device to detect a photographic lens position corresponding to the in-focus state; and a photographic distance determination device to derive a photographic distance based on the lens position detected by the lens position identification device.

17. A camera as recited in claim 16, wherein the lens position detection device outputs a pulse number corresponding to an amount of movement of the photographic lens required to bring the lens to an in-focus state, and the photographic distance is determined according to the number of pulses output by the lens position detection device.

18. A camera as recited in claim 13, wherein the number of predetermined distance regions is set to an integer multiple of the number of display segments.

19. A camera as recited in claim 13, further comprising:

a depth of field computation device to compute a depth of field of the photographic subject according to the distance region identified by the distance region identification device; and a depth of field display device to identify a group of display segments corresponding to the computed depth of field and to modify the identified group of display segments to display the depth of field.

20. A camera as recited in claim 19, wherein the depth of field display device eliminates from the group of display segments displaying the depth of field of those display segments which represent a photographic distance both within the computed depth of field and outside the computed depth of field.

* * * * *

UNITED STATES PATENT AND TRADEMARK OFFICE
CERTIFICATE OF CORRECTION

PATENT NO. : 5,687,409
DATED : November 11, 1997
INVENTOR(S) : Hidenori MIYAMOTO It is certified that error appears in the above-indentified patent and that said Letters Patent is hereby corrected as shown below:

Col. 16, Claim 16, line 66, change "mount" to --amount--.

Signed and Sealed this

Thirty-first Day of March, 1998

Attest:

BRUCE LEHMAN

Attesting Officer

Commissioner of Patents and Trademarks